(12) United States Patent
Baek

(10) Patent No.: US 10,596,908 B1
(45) Date of Patent: Mar. 24, 2020

(54) INPUT APPARATUS FOR VEHICLE

(71) Applicants: HYUNDAI MOTOR COMPANY, Seoul (KR); KIA MOTORS CORPORATION, Seoul (KR)

(72) Inventor: Joheum Baek, Anyang-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/207,783

(22) Filed: Dec. 3, 2018

(30) Foreign Application Priority Data

Sep. 27, 2018 (KR) .................... 10-2018-0115193

(51) Int. Cl.
*B60K 37/06* (2006.01)
*G05G 1/08* (2006.01)
*H01H 3/08* (2006.01)

(52) U.S. Cl.
CPC ........ *B60K 37/06* (2013.01); *B60K 2370/126* (2019.05); *G05G 1/087* (2013.01); *H01H 3/08* (2013.01); *H01H 2003/085* (2013.01)

(58) Field of Classification Search
CPC .. B60K 37/06; G05G 1/087; H01H 2003/085; B60H 2370/126
See application file for complete search history.

(56) References Cited

U.S. PATENT DOCUMENTS

| | | | |
|---|---|---|---|
| 6,564,661 B2 * | 5/2003 | DeJonge | B60K 37/06 74/335 |
| 9,477,329 B1 * | 10/2016 | Ding | G06F 3/0362 |
| 2008/0046101 A1 * | 2/2008 | Klein | B60K 37/06 700/29 |
| 2017/0001521 A1 * | 1/2017 | Joo | B60N 2/002 |
| 2018/0172145 A1 * | 6/2018 | Farges | F16H 61/22 |

FOREIGN PATENT DOCUMENTS

| | | | | |
|---|---|---|---|---|
| DE | 19645675 A1 * | 5/1998 | | B60K 37/06 |
| DE | 102004019893 A1 * | 11/2005 | | B60K 35/00 |

* cited by examiner

*Primary Examiner* — Luis A Gonzalez
(74) *Attorney, Agent, or Firm* — Morgan, Lewis & Bockius LLP

(57) ABSTRACT

An input apparatus for a vehicle includes: a knob rotatably disposed in a plate; a driving device allowing the knob to protrude from or move downward into the plate; and a switching mechanism movable disposed to surround an outer circumferential surface of the knob protruding from the plate and disposed along a circumference of the knob moved downward into the plate.

14 Claims, 12 Drawing Sheets

INPUT APPARATUS FOR VEHICLE

CROSS-REFERENCE TO RELATED APPLICATION

This application claims the benefit of Korean Patent Application No. 10-2018-0115193, filed on Sep. 27, 2018 in the Korean Intellectual Property Office, the disclosure of which is incorporated herein by reference.

TECHNICAL FIELD

The present disclosure relates to an input apparatus for a vehicle that is improved to enable switching of types.

BACKGROUND

Electronic devices supporting an audio function, a video function, a navigation function, an air conditioning control, a seat control, a light control in addition to basic driving functions for a user have been available in a vehicle, and input apparatuses for a vehicle for inputting various control commands are generally mounted in the electronic devices.

Various input apparatuses for a vehicle have been studied to allow a user to safely and conveniently perform functions.

As the input apparatus for a vehicle, a dial input apparatus operated by turning a dial, which is one of input apparatuses forming an interface between an information communication device using various displays and a user, has been widely used.

Recently, a touch input apparatus capable of interfacing between an information communication device and a user by allowing a user to directly touch or approach a touch pad or a touch screen using an input tool such as a finger or a touch pen has appeared.

The input apparatus for a vehicle is generally installed at a predetermined position of a vehicle in a fixed manner.

The dial input apparatus may include a protruding type in which a user grips and rotates a knob and which is configured to perform an operation such as a vertical, lateral, multidirectional scroll or the like, and a concave type in which a user turns a knob ring with a fingertip without gripping a knob with a hand of a user or which is configured to perform an operation such as a vertical, lateral, multidirectional scroll or the like.

The concave type has increased convenience by simplifying an input method and an operation method to perform any function of the protruding type with just a finger.

However, since a user accustomed to the protruding type is not accustomed with the concave type using just a finger, the user may prefer the protruding type, and thus the dial input apparatus should be used by switching between the protruding type and the concave type according to a method that the user prefers to satisfy user needs.

SUMMARY

It is an aspect of the present disclosure to provide an input apparatus for a vehicle capable of enabling switching between a protruding type and a concave type.

It is an aspect of the present disclosure to provide an input apparatus for a vehicle capable of enabling a knob to be movable.

It is an aspect of the present disclosure to provide an input apparatus for a vehicle including a switching mechanism configured to move as the knob moves.

Additional aspects of the disclosure will be set forth in part in the description which follows and, in part, will be obvious from the description, or may be learned by practice of the disclosure.

In accordance with one aspect of the present disclosure, an input apparatus for a vehicle includes: a knob rotatably disposed in a plate; a driving device moving the knob upwardly to protrude from the plate or move downwardly into the plate; and a switching mechanism movable disposed to surround an outer circumferential surface of the knob when the knob is moved upwardly to protrude from the plate or disposed along a circumference of the knob when the knob is moved downward into the plate. The switching mechanism may be connected with the knob to rotate with the knob.

A first switching end of the switching mechanism may be supported by the knob so that the switching mechanism protrudes from or moves downward into the plate along with the knob.

The input apparatus for a vehicle may further include a guide including a first guide provided on an outer portion of the switching mechanism and a second guide provided on one side of the knob to guide movement of the switching mechanism.

The plate may include an accommodator in which the knob and the switching mechanism are accommodated, and the input apparatus for a vehicle may further include a cover provided to be movable to cover the accommodator.

The cover may include a first cover end of the cover connected with a second switching end of the switching mechanism so that the cover moves as the switching mechanism moves.

The cover may be disposed in the first guide to be withdrawn from the first guide.

The guide may further include a first fixer provided in the first guide and configured to fix a second cover end of the cover and a second fixer provided in the second guide and configured to fix the first cover end so as to fix the switching mechanism.

The driving device may include a moving bar connected with the knob to move the knob and a driver provided to provide power to the moving bar.

The switching mechanism may include a plurality of switching rods connected and arranged along a circumference of the knob so that the switching mechanism surrounds the knob.

The plurality of switching rods may include a supporter connected with the knob and the rotator rotatably connected with the supporter.

The rotator may pivot in a direction distanced from the supporter so that the switching mechanism is spread along a circumference of the knob moved downward into the plate.

The rotator may pivot in a direction approaching the supporter so that the switching mechanism surrounds an outer circumferential surface of the knob protruding from the plate.

The plurality of switching rods may further include a limiter provided in the supporter to limit rotation of the rotator.

The supporters of two adjacent switching rods of the plurality of switching rods may be connected with each other, and the facing rotators may overlap each other.

In accordance with another aspect of the present disclosure, an input apparatus for a vehicle includes: a knob protruding from or moving downward into a plate; and a switching mechanism connected with the knob to protrude from or move downward into the plate along with the knob, wherein the switching mechanism includes a plurality of switching rods connected and arranged to surround the knob.

The plurality of switching rods may include a supporter configured to surround an outer circumferential surface of the knob protruding from the plate, a rotator disposed along a circumference of the knob moved downward into the plate and rotatably connected to the supporter, and a limiter provided in the supporter to limit rotation of the rotator.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Embodiments described in this specification and configurations illustrated in drawings are only exemplary examples of the present disclosure, and there may be various modifications that may substitute for the embodiments and the drawings in the specification at the time of this application's filing.

Further, the same reference number or symbols disclosed in each of the drawings of the specification denote identical components or configurations which perform substantially the same functions. Terms used in the present disclosure specification are only used to describe specific exemplary embodiments and do not limit the present disclosure.

Singular forms used herein are intended to include plural forms unless explicitly indicated otherwise. It should be further understood that the terms "comprises" or "have" used in this specification specify the presence of stated features, numerals, steps, operations, components, parts, or a combination thereof.

Therefore, the terms do not preclude the presence or addition of one or more other features, numerals, steps, operations, components, parts, or a combination thereof.

In addition, the terms including ordinal numbers such as "first," "second," and the like used herein may be used to explain various components, but the components are not limited by the terms. The terms are only used to differentiate one component from other components.

For example, a first component may be referred to as a second component without departing from the scope of the present disclosure, and a second component may also be similarly referred to as a first component. The term "and/or" includes any one or a combination of the relevant described items.

The terms used in the following description, such as "front side," "rear side," "upper portion," and "lower portion" are defined on the basis of the drawings, and the shape and position of each component are not limited by the terms.

Hereinafter, exemplary embodiments of the present disclosure will be described in detail with reference to the accompanying drawings.

Figure 1:
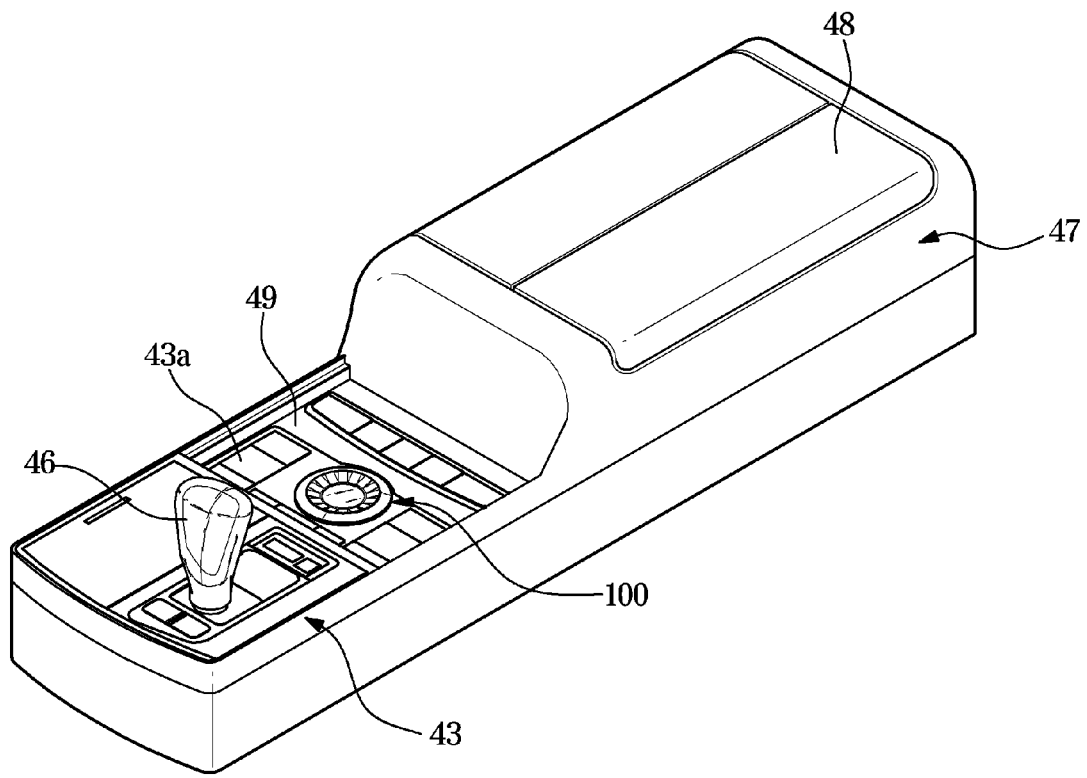
FIG. 1 is a perspective view illustrating a gear box including the input apparatus for a vehicle according to one embodiment of the present disclosure.
Figure 2:
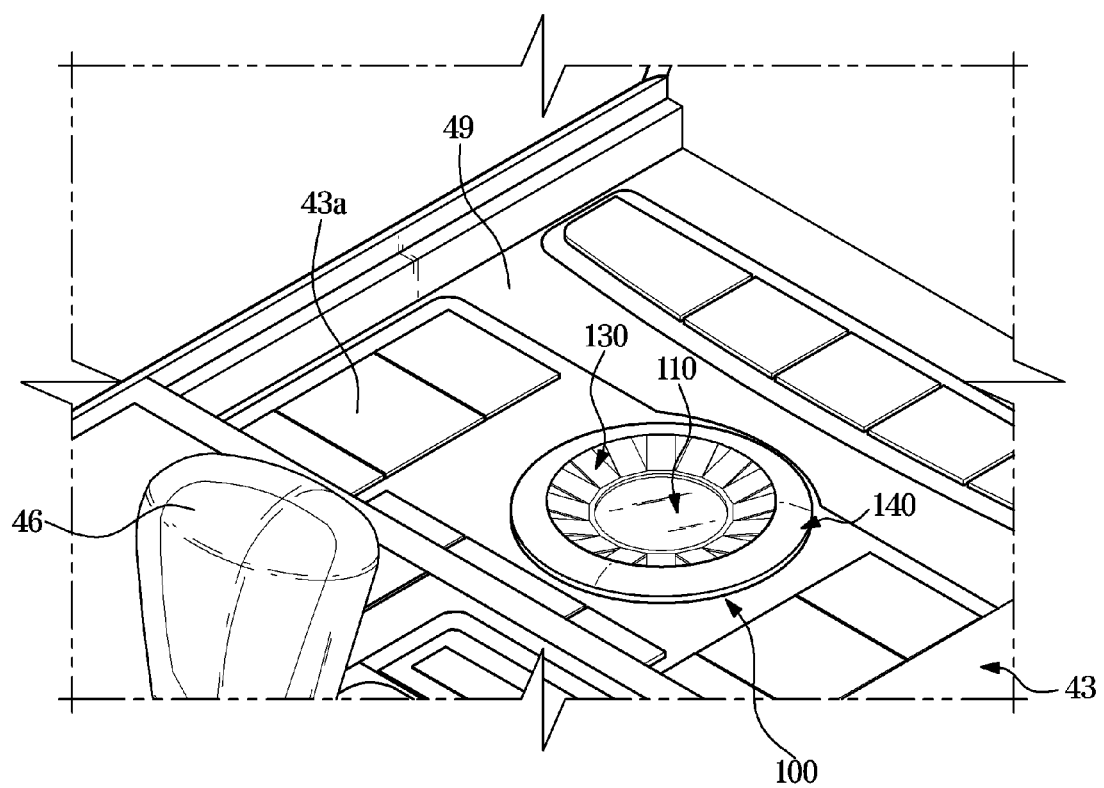
FIG. 2 is a view illustrating a state in which the input apparatus for a vehicle according to one embodiment of the present disclosure is applied as a concave type.
Figure 3:
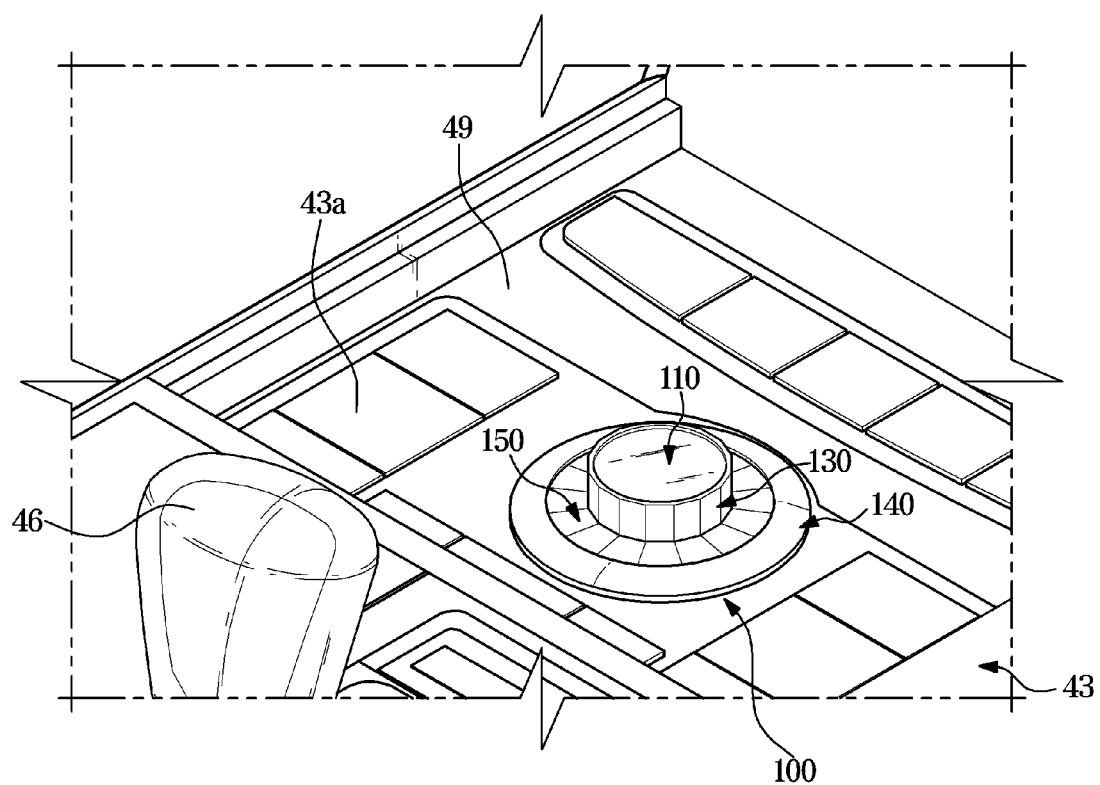
FIG. 3 is a view illustrating a state in which the input apparatus for a vehicle according to one embodiment of the present disclosure is applied as a protruding type.

FIG. 1 is a perspective view illustrating a gear box including the input apparatus for a vehicle according to one embodiment of the present disclosure. FIG. 2 is a view illustrating a state in which the input apparatus for a vehicle according to one embodiment of the present disclosure is applied as a concave type. FIG. 3 is a view illustrating a state in which the input apparatus for a vehicle according to one embodiment of the present disclosure is applied as a protruding type.

As shown in FIGS. 1 to 3, a rear portion of the gear box 43 may be connected with a center console 47. In FIG. 1, the gear box 43 and the center console 47 are integrally provided, but those are not limited thereto. On the contrary, the gear box 43 and the center console 47 may be separately provided.

A gear shifting device 46 for shifting gears of a vehicle and various components related to gear-shifting may be installed or embedded in the gear box 43. Various input units may be installed in the gear box 43 to allow a user to control a main function of a display device or the vehicle.

A plurality of button input units 43a for performing specific functions may be installed in the gear box 43. Various functions may be performed by only one input unit for a beautiful design and combined operation.

The center console 47 may include a storage space formed therein. An arm rest 48 allowing a driver to put an arm of the driver thereon may be provided on an upper portion of the center console 47.

The driver may operate the gear shifting device 46 while putting the arm on the arm rest 48 or may push the button input unit 43a.

The arm rest 48 may be formed of an elastic or soft material to provide comfort for a user. The arm rest 48 may include a surface finished with leather for a luxurious appearance.

The storage space may be generally provided in the center console 47. The storage space may be exposed when the arm rest 48 is opened.

An input apparatus 100 for a vehicle may be mounted in the gear box 43. The input apparatus 100 is connected with the display device in the vehicle and may select or perform various icons displayed on the display device. A separate display may be installed in the gear box 43 as necessary.

The input apparatus 100 may move a cursor displayed on the display device or perform an icon thereon. The icon may include a main menu, a selection menu, a setting menu, and the like.

The input apparatus 100 may set a driving condition of the vehicle or may operate peripheral devices of the vehicle.

The input apparatus 100 may include a dial input device, a touch input device, a combined input device, or the like.

The dial input device may be provided as a knob type to be gripped by a user and rotatably operated, and the touch input device may include a touch pad provided on an upper surface thereof.

The dial input device includes a protruding-type in which a user grips and rotates a dial with a hand and which performs an operation such as a vertical, lateral, multidirectional scroll, or the like, and a concave type in which a user turns a dial with a fingertip without gripping the dial with a hand of the user or which performs an operation such as a vertical, lateral, multidirectional scroll, or the like.

The concave type increases convenience by simplifying an input method and an operation method to perform any function of the protruding-type with just a finger.

However, since a user accustomed to the protruding-type is not accustomed to the concave type using just a finger, the user may prefer the protruding type, and thus the dial input device should be used by switching between the protruding-type and the concave type according to a method that a user prefers to satisfy user needs.

The input apparatus 100 according to the embodiment of the present disclosure may include a dial and touch input device combined type, and a dial input device switchable between the protruding type and the concave type.

Although not shown in FIG. 1, the input apparatus 100 according to the embodiment of the present disclosure may be installed in a center plate (not shown) provided in a rear seat in the vehicle.

The center plate (not shown) in the rear seat may be generally installed between a left seat (not shown) and a right seat (not shown) of the rear seat in the vehicle, and can increase convenience of a rear seat user by a cup holder or input units, such as various buttons and the like, provided thereon.

The input apparatus 100 according to the embodiment of the present disclosure includes a knob 110 installed in a plate 49 and rotatably provided and a switching mechanism 130 connected with the knob 110 to be rotatable with the knob 110.

The knob 110 may include a knob body 112 and a touch part 111 provided on the knob body 112. The knob 110 may be provided in a cylindrical shape.

The user may input a rotation signal to the input apparatus 100 by an operation of rotating while gripping an outer surface of the knob 110. The knob 110 may be provided to rotate about a predetermined rotation axis in a predetermined direction (a clockwise direction or a counterclockwise direction).

The knob 110 may be provided to be inclined in at least one direction with respect to a central axis of the knob 110. The knob 110 may be inclined in a front and rear or lateral direction. The user may input a predetermined instruction or command by rotating the knob 110 or making the knob 110 inclined in a predetermined direction.

The knob 110 may include various components, which are related to an operation, embedded therein. The knob 110 may include a rotating shaft (not shown) coupled to enable the knob 110 to rotate and various components related to the rotating shaft such as a bearing (not shown) and the like.

The knob 110 may include the touch part 111 formed on an upper surface thereof and enabling input through touch. The touch part 111 may detect a touch signal of a user. The touch part 111 may be a touch pad to which a signal is input when a user touches the touch part 111 with a pointer, such as a finger, a touch pen, or the like, or approaches the touch part 111.

The user may input a required instruction or command by inputting a predetermined touch gesture. The touch pad may include a touch film or a touch sheet including a touch sensor despite the name. The touch pad may include a touch panel which is a display device enabling touch on a screen.

The touch pad may use a resistive film method, an optical method, a capacitive method, an ultrasonic method, a pressure method, or the like. That is, the touch pad of various well-known methods may be used.

The touch part 111 may include a concave shape. The concave shape refers to a dented or recessed shape and may include an inclined or stepped concave shape as well as a rounded concave shape.

The touch part 111 may include a concavely curved surface shape. The touch part 111 is provided as a concavely curved surface with a predetermined curvature. Curved surfaces of the touch part 111 may vary. The touch part 111 may be provided in a circular shape. When the touch part 111 is provided in a circular shape, a concavely curved surface may be easily formed.

When the touch part 111 is provided in a circular shape, a user may detect a touch area of the touch part 111 through a tactile sense, and thus a rolling or spinning operation may be easily input.

Various semiconductor chips, printed circuit boards, and the like may be installed in the input apparatus 100. The semiconductor chip may be mounted on the printed circuit board. The semiconductor chip may process information or store data.

The touch part 111 may be provided to perform a pushing operation or an inclining operation, and a user may input an operation signal by applying a pressure to the touch part 111 to press or incline a portion of the touch part 111.

In this case, the pressing operation may include a case in which the touch part 111 is horizontally pressed or a case in which the touch part 111 is inclinedly pressed. When the touch part 111 is flexibly provided, only a part of the touch part 111 can be pressed.

The input apparatus 100 may be switched between the protruding type and the concave type depending on whether the knob 110 and the switching mechanism 130 protrude or move downward. In the case of the protruding type, the knob 110 and the switching mechanism 130 may protrude from the plate 49. In the case of the concave type, the knob 110 and the switching mechanism 130 may be moved downward into the plate 49.

The input apparatus 100 may include a switching mechanism 130 provided to be inclined downward along an outline of the touch part 111. When the knob 110 is provided in a circular shape, the switching mechanism 130 may be provided to surround a circumference of the knob 110.

When the input apparatus 100 is applied as the concave type, the touch part 111 of the knob 110 may be operated as a gesture inputter, and the knob 110 and the switching mechanism 130 may be operated as a swiping inputter.

A user may input a swiping gesture along the switching mechanism 130 provided in a ring shape. The user may input a swiping gesture along the switching mechanism 130 in a clockwise direction or may input a swiping gesture in a counterclockwise direction.

Different gestures may be input depending on whether points of time when the swiping gesture is input and when inputting of the swiping gesture is finished vary.

The swiping gesture input to the switching mechanism 130 positioned on the left of the knob 110 and a swiping gesture input to the switching mechanism 130 positioned on the right of the knob 110 may cause operations that are different from each other.

Although a user inputs a swiping gesture by touching the same point with a finger, when a point at which the gesture finishes is different, that is, a position at which the user detaches the finger is different, different gestures may be recognized.

The switching mechanism 130 may input a tap gesture. The user may issue orders or instructions that are different from each other according to a position of the switching mechanism 130 that the user taps.

An inclination of the switching mechanism 130 may be provided to be greater than an inclination in a tangent direction of the touch part 111 at a boundary between the switching mechanism 130 and the touch part 111.

When the gesture is input to the touch part 111, an inclination of the switching mechanism 130 may be provided more sharply than that of the touch part 111, and thus the user may intuitively feel a touch area of the touch part 111.

While a gesture is input to the touch part 111, a touch of the switching mechanism 130 may not be detected. Therefore, while the user inputs a gesture to the touch part, even approaching the boundary with the switching mechanism 130, an input of a gesture of the touch part 111 and an input of a swiping gesture of the switching mechanism 130 may not overlap.

The switching mechanism 130 may be provided to be movable to surround an outer circumferential surface of the knob 110 protruding from the plate 49 or to be disposed along a circumference of the knob 110 moved downward into the plate 49.

Figure 4:
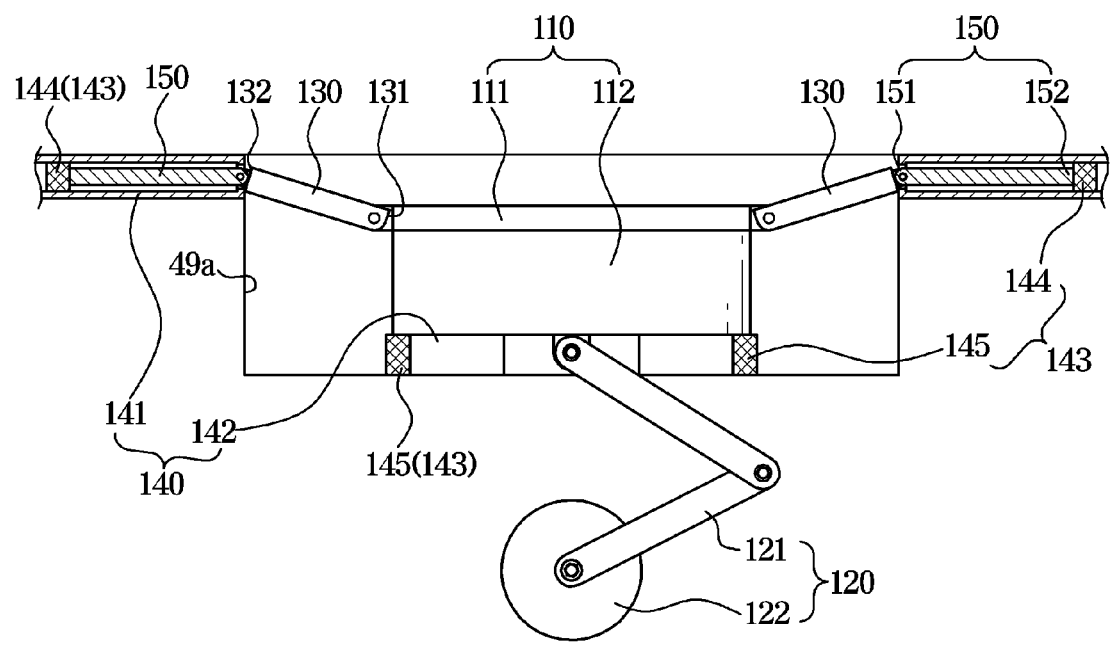
FIG. 4 is a view schematically illustrating a state in which the input apparatus for a vehicle according to one embodiment of the present disclosure is applied as the concave type.
Figure 5:
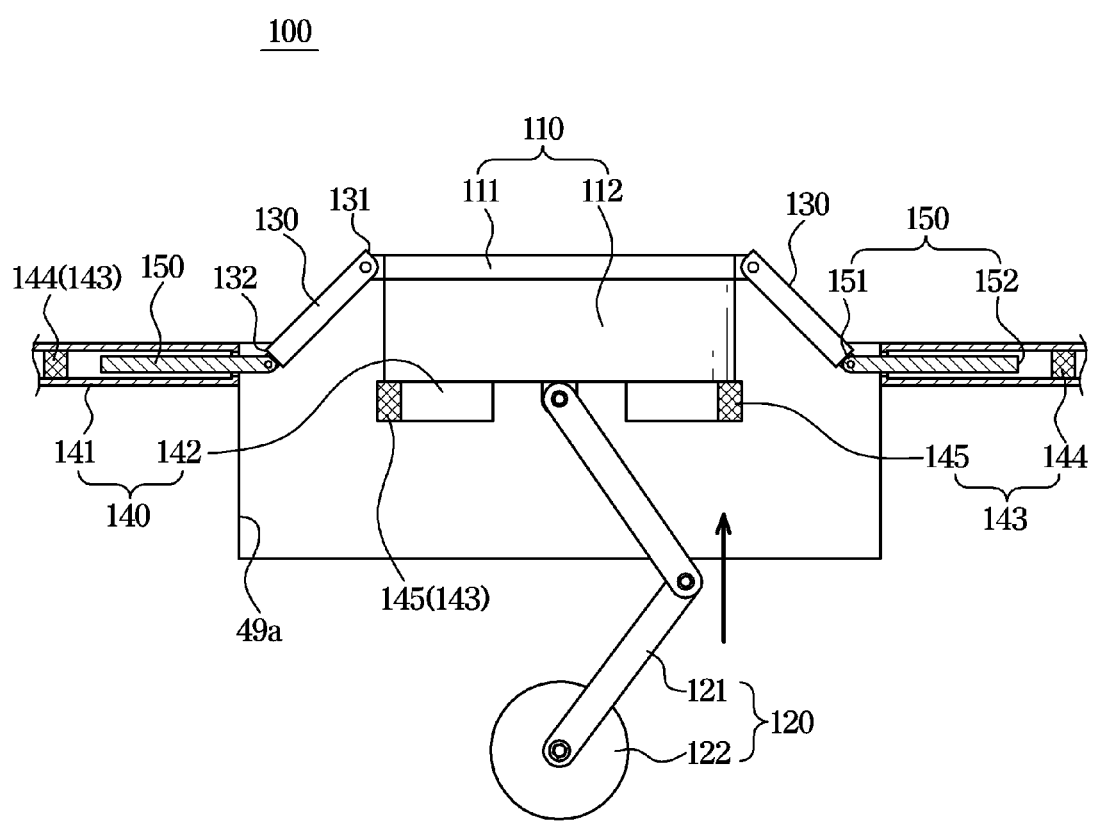
FIG. 5 is a view schematically illustrating a state in which the input apparatus for a vehicle according to one embodiment of the present disclosure is switched from the concave type to the protruding type.
Figure 6:
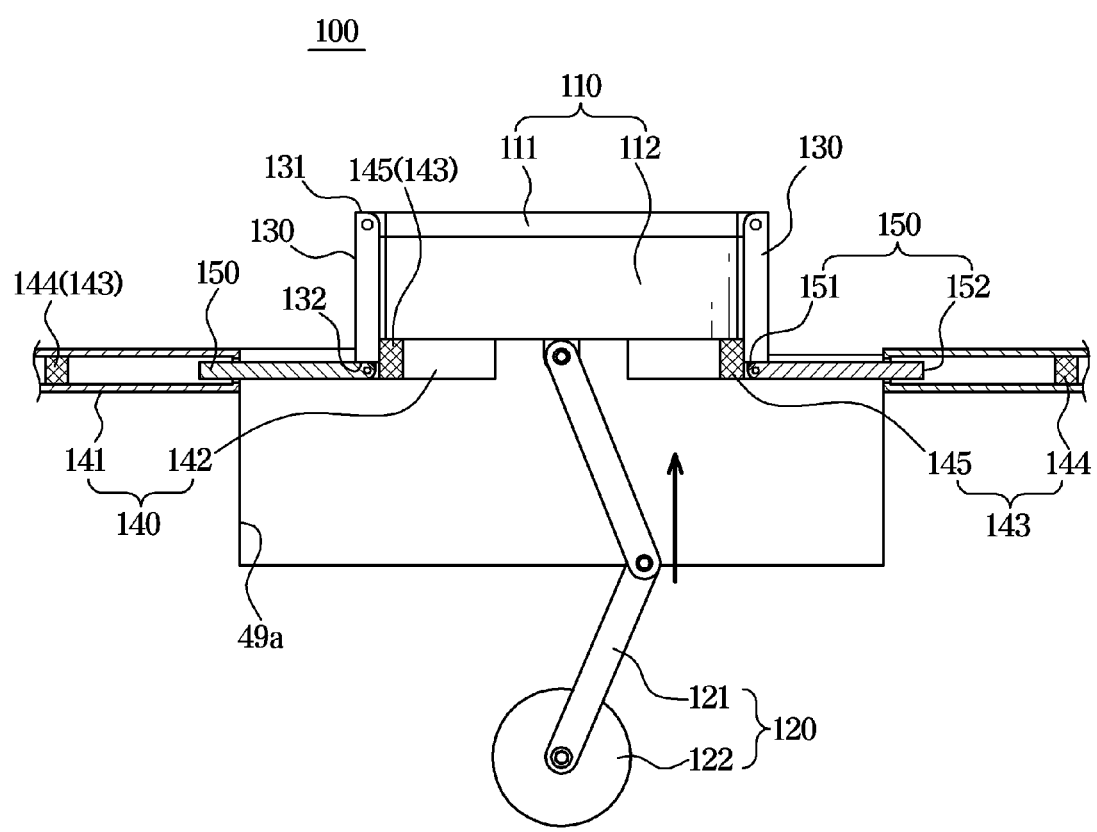
FIG. 6 is a view schematically illustrating a state in which the input apparatus for a vehicle according to one embodiment of the present disclosure is applied as the protruding type.

FIG. 4 is a view schematically illustrating a state in which the input apparatus for a vehicle according to one embodiment of the present disclosure is applied as the concave type. FIG. 5 is a view schematically illustrating a state in which the input apparatus for a vehicle according to one embodiment of the present disclosure is switched from the concave type to the protruding type. FIG. 6 is a view schematically illustrating a state in which the input apparatus for a vehicle according to one embodiment of the present disclosure is applied as the protruding type.

As shown in FIGS. 4 to 6, the plate 49 (see FIG. 3) may include an accommodator 49a in which the knob 110 and the switching mechanism 130 are accommodated. A first switching end 131 of the switching mechanism 130 may be supported by the knob 110 so that the switching mechanism 130 protrudes from or moves downward into the plate 49 along with the knob 110.

The input apparatus 100 may include a driving device 120 configured so that the knob 110 protrudes from or moves downward into the plate 49.

The driving device 120 may include a moving bar 121 connected with the knob 110 to move the knob 110 and a driver 122 provided to provide power to the moving bar 121.

The moving bar 121 may include a link structure, and the driver 122 may include a motor, but those are not limited thereto. A detailed structure of the driving device 120 will be described below.

The switching mechanism 130 may be disposed along a circumference of the knob 110 when the input apparatus 100 is applied as the concave type, and the switching mechanism 130 may surround an outer circumferential surface of the knob 110 when the input apparatus 100 is applied as the protruding type.

The input apparatus 100 may include a guide 140 provided to guide movement of the switching mechanism 130.

The guide 140 may include a first guide 141 provided on an outer side of the switching mechanism 130 and a second guide 142 provided on one side of the knob 110. The second guide 142 may be connected with the knob body 112 to be disposed under the knob body 112.

A position of the first guide 141 may be fixed, and the second guide 142 may move upward or downward with the knob 110 as the knob 110 moves. In this case, the moving upward or downward may refer to a direction of moving upward or downward in the drawings.

The guide 140 may include a circular shape. The guide 140 may include a donut shape, but the shape is not limited thereto.

A separate key button (not shown) or a touch button (not shown) may be disposed in the first guide 141. A user may input a gesture to the touch part 111 or may input a signal using a button (not shown) provided in the first guide 141 around the switching mechanism 130.

The input apparatus 100 may include a wrist supporting part (not shown) positioned under the first guide 141 to support a wrist of a user. Therefore, a musculoskeletal system disorder of a user can be prevented, and a more comfortable operational sense can be provided.

The switching mechanism 130 may include a portion lower than a boundary with the first guide 141. The switching mechanism 130 is provided to be inclined downward from the boundary with the first guide 141 or may be positioned to be stepped from the boundary with the first guide 141.

The switching mechanism 130 includes the portion lower than the boundary with the first guide 141, and thus a user may recognize an area and boundary of the switching mechanism 130 through a tactile sense.

The input apparatus 100 may include a cover 150 disposed in the first guide 141. The cover 150 may be disposed in the first guide 141 to be withdrawn from the first guide 141.

The first cover end 151 of the cover 150 may be connected with the second switching end 132 of the switching mechanism 130 so that the cover 150 moves as the switching mechanism 130 moves.

When the input apparatus 100 is applied as the concave type, the cover 150 may be inserted into the first guide 141. When the input apparatus 100 is applied as the protruding type, the cover 150 may be withdrawn from the first guide 141.

The cover 150 may be moved with the switching mechanism 130. The cover 150 slides as the switching mechanism 130 moves.

When the input apparatus 100 is applied as the concave type, the accommodator 49a of the plate 49 may be covered by the knob 110 and the switching mechanism 130. When the input apparatus 100 is applied as the protruding type, the accommodator 49a may be covered by the knob 110 and the cover 150.

The cover 150 may include a circular shape. The cover 150 may include a donut shape, but the shape is not limited thereto.

The guide 140 may include a fixer 143 provided to fix the switching mechanism 130. The fixer 143 may include a first fixer 144 provided in the first guide 141 and a second fixer 145 provided in the second guide 142.

The first fixer 144 may fix a second cover end 152 of the cover 150, and the second fixer 145 may fix the first cover end 151 of the cover 150. The first cover end 151 may be connected with the second switching end 132.

The fixer 143 may include various shapes and structures within a limitation that the cover 150 is fixable.

Hereinafter, an operation in which the input apparatus 100 according to the embodiment of the present disclosure is switched between the concave type and the protruding type will be described in detail.

First, while the knob 110 and the switching mechanism 130 are moved downward into the plate 49, and the input apparatus 100 is applied as the concave type, the moving bar 121 may move the knob 110 by driving force of the driver 122 in a direction of protruding from the plate 49.

The first switching end 131 may protrude from the plate 49 with the switching mechanism 130 connected with one side of the knob 110 as the knob 110 moves.

The accommodator 49a of the plate 49 exposed to the outside when the switching mechanism 130 protrudes and moves toward an outer circumferential surface of the knob 110 may be covered by the cover 150 disposed in the first guide 141.

That is, the first cover end 151 is connected with the second switching end 132 of the switching mechanism 130, and the cover 150 may cover the accommodator 49a by sliding and being withdrawn from the first guide 141 as the switching mechanism 130 moves.

When the input apparatus 100 is switched to the protruding type, the first cover end 151 of the withdrawn cover 150 may be fixed by the second fixer 145 disposed in the second guide 142. Therefore, the knob 110 and the switching mechanism 130 are also fixed with the cover 150, and the input apparatus 100 may be applied as the protruding type.

On the contrary, when the input apparatus 100 applied as the protruding type is switched to the concave type, the cover 150 fixed to the second fixer 145 is unfixed, and the knob 110 and the switching mechanism 130 may be moved by the driving device 120 in a direction of moving downward into the plate 49.

The cover 150 may be inserted into the first guide 141 as the switching mechanism 130 moves, and the second cover end 152 may be fixed by the first fixer 144 provided in the first guide 141.

Therefore, the knob 110 and the switching mechanism 130 are also fixed with the cover 150, and the input apparatus 100 may be applied as the concave type.

Figure 7:
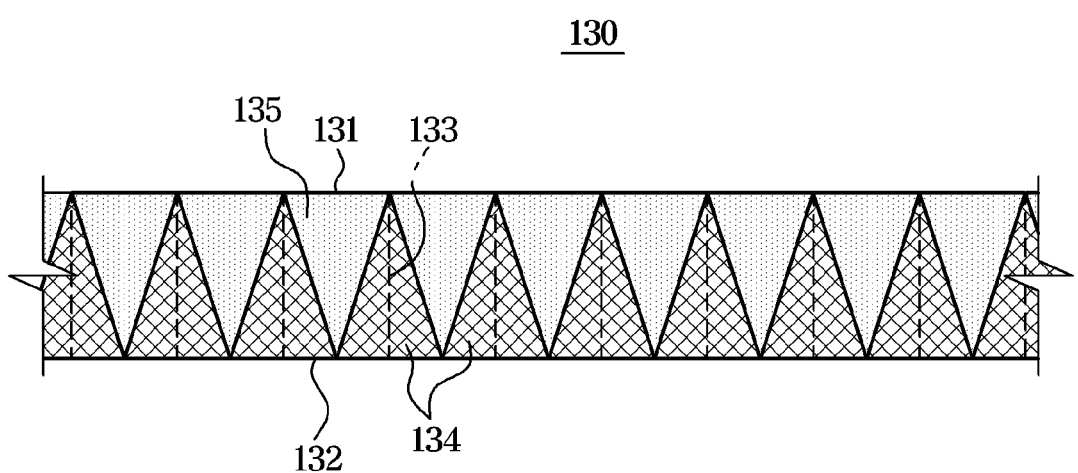
FIG. 7 is a view schematically illustrating a switching mechanism applied as the protruding type in the input apparatus for a vehicle according to one embodiment of the present disclosure.
Figure 8:
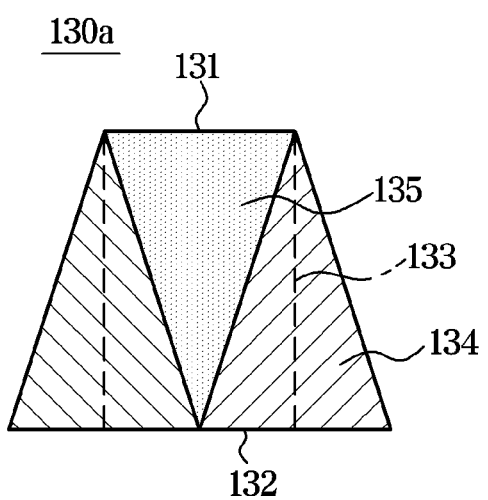
FIG. 8 is a view schematically illustrating a unit switching mechanism in which a rotator is fixed in the input apparatus for a vehicle according to one embodiment of the present disclosure.
Figure 9:
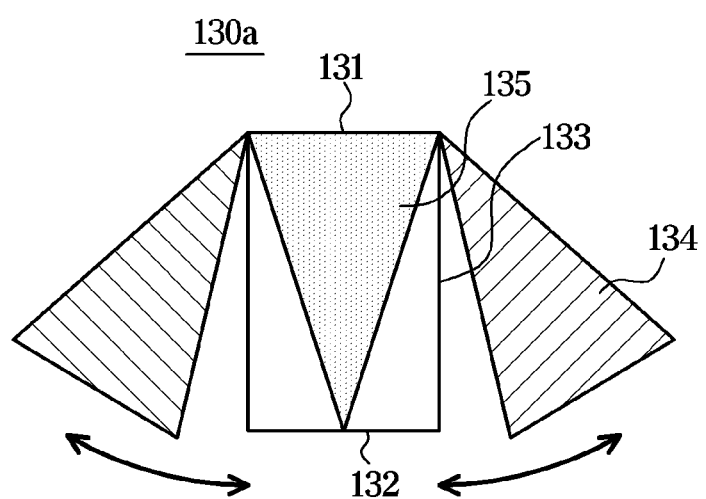
FIG. 9 is a view schematically illustrating the unit switching mechanism in which the rotator is rotated in the input apparatus for a vehicle according to one embodiment of the present disclosure.
Figure 10:
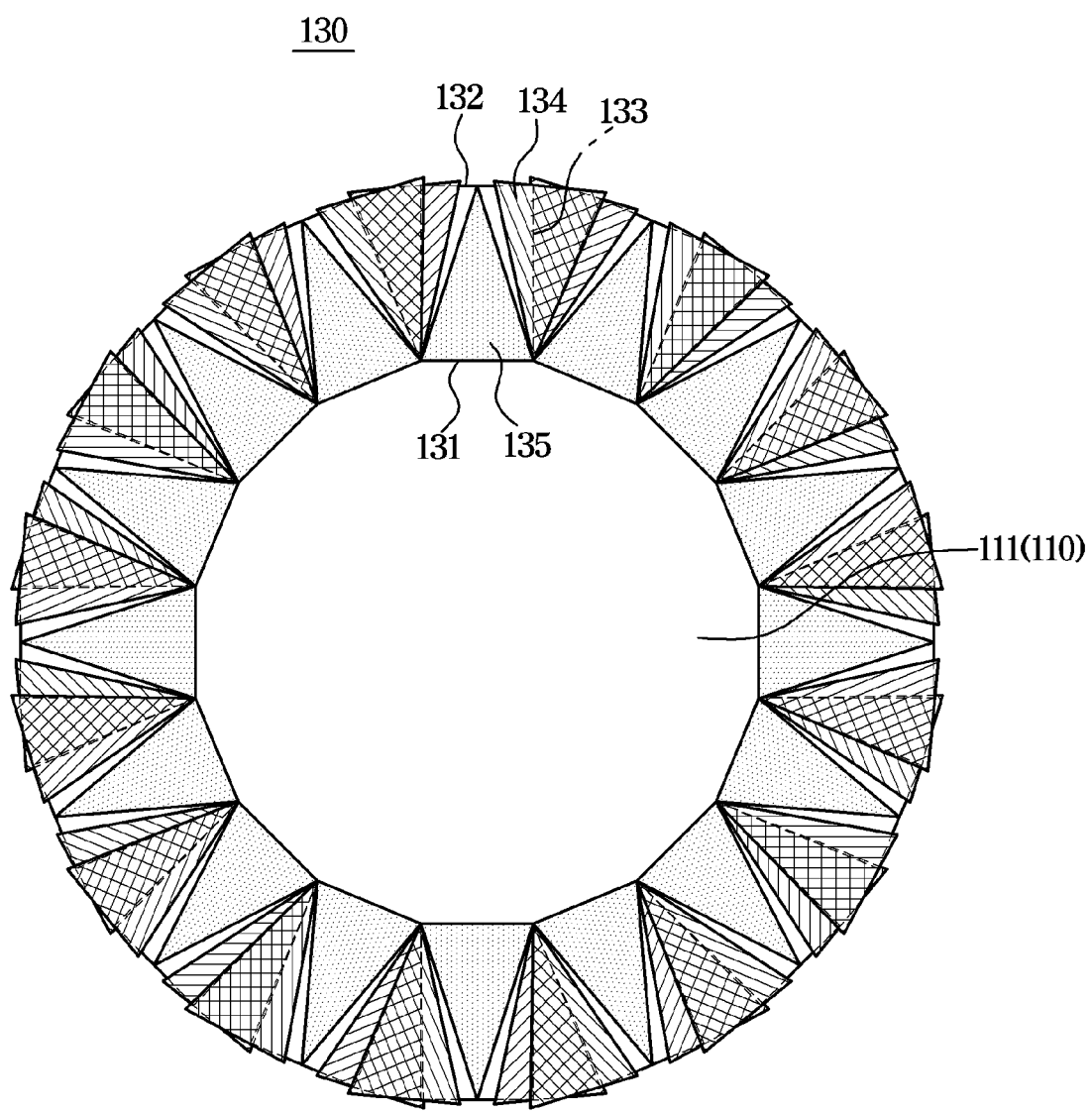
FIG. 10 is a rear view schematically illustrating the switching mechanism in the concave type of the input apparatus for a vehicle according to one embodiment of the present disclosure.

FIG. 7 is a view schematically illustrating a switching mechanism applied as the protruding type in the input apparatus for a vehicle according to one embodiment of the present disclosure. FIG. 8 is a view schematically illustrating a unit switching mechanism in which a rotator is fixed in the input apparatus for a vehicle according to one embodiment of the present disclosure. FIG. 9 is a view schematically illustrating the unit switching mechanism in which the rotator is rotated in the input apparatus for a vehicle according to one embodiment of the present disclosure. FIG. 10 is a rear view schematically illustrating the switching mechanism in the concave type of the input apparatus for a vehicle according to one embodiment of the present disclosure.

As shown in FIGS. 7 to 10, the switching mechanism 130 may include a plurality of unit switching rods 130a disposed to be connected along a circumference of the knob 110 so that the switching mechanism 130 surrounds the knob 110 (see FIG. 3).

The plurality of unit switching rods 130a may include a supporter 133 connected with the knob 110 and a rotator 134 rotatably connected with the supporter 133. The two rotators 134 may be provided on both sides of the supporter 133, but this is not limited thereto.

The rotator 134 may overlap the supporter 133. The rotator 134 may overlap a rear surface of the supporter 133.

The rotator 134 may rotate toward an outer side of the supporter 133 so that the switching mechanism 130 is spread along a circumference of the knob 110 moved downward into the plate 49 (see FIG. 3).

The rotator 134 may pivot in a direction distanced from the supporter 133 so that the switching mechanism 130 is spread along the circumference of the knob 110 moved downward into the plate 49, but is not limited thereto.

The rotator 134 may rotate toward an inner side of the supporter 133 so that the switching mechanism 130 surrounds an outer circumferential surface of the knob 110 protruding from the plate.

The rotator 134 may pivot in a direction approaching the supporter 133 so that the switching mechanism 130 surrounds an outer circumferential surface of the knob 110 protruding from the plate 49, but is not limited thereto.

The plurality of unit switching rods 130a may include a limiter 135 provided on the supporter 133 to limit rotation of the rotator 134. The limiter 135 may overlap the supporter 133.

When the input apparatus 100 (see FIG. 3) is applied as the protruding type, the limiter 135 may limit the rotation of the rotator 134. One side of the rotator 134 is in contact with one side of the limiter 135 so that the rotation of the rotator 134 may be limited.

The limiter 135 may be disposed to overlap a rear surface of the supporter 133, but is not limited thereto.

The supporters 133 of two adjacent unit switching rods 130a of the plurality of unit switching rods 130a may be connected to each other. The supports of the plurality of unit switching rods 130a are arranged to be connected to each other and may be disposed along a circumference of the knob 110.

The facing rotators 134 of the two adjacent unit switching rods 130a of the plurality of unit switching rods 130a may overlap each other.

In the drawings, the supporter 133 includes a rectangular shape, and the rotator 134 and the limiter 135 include triangular shapes, but those are not limited thereto. The supporter 133, the rotator 134, and the limiter 135 may include various shapes and structures within a limitation that the input apparatus 100 is switchable between the protruding type and the concave type.

Hereinafter, when the input apparatus 100 according to the embodiment of the present disclosure is switched between the protruding type and the concave type, movement of the switching mechanism 130 will be described.

When the input apparatus 100 according to the embodiment of the present disclosure is applied as the protruding type, the supporter 133 of the unit switching rod 130a may completely surround an outer circumferential surface of the knob 110. The supporters 133 of two adjacent unit switching rods 130a of the plurality of unit switching rods 130a may be in surface-contact with each other.

The limiter 135 may limit rotation of the rotator 134, and the rotator 134 may be disposed between the supporter 133 and the knob 110.

The facing rotators 134 of the two adjacent unit switching rods 130a of the plurality of unit switching rods 130a may completely overlap each other. The rotators 134 may overlap the two supporters 133 of the two adjacent unit switching rods 130a of the plurality of unit switching rods 130a in half.

When the input apparatus 100 according to the embodiment of the present disclosure is applied as the concave type, the supporter 133 of the unit switching rod 130a may be spread along a circumference of the knob 110. The supporters 133 of the two adjacent unit switching rods 130a of the plurality of unit switching rods 130a may be in linear contact with each other.

The rotator 134 may be separated from the limiter 135, and the rotator 134 may be disposed between the knob 110 and the first guide 141 (see FIG. 4).

The facing rotators 134 of the two adjacent unit switching rods 130a of the plurality of unit switching rods 130a may partially overlap each other. The rotator 134 may partially overlap two supports 133 of the two adjacent unit switching rods 130a of the plurality of unit switching rods 130a.

Figure 11:
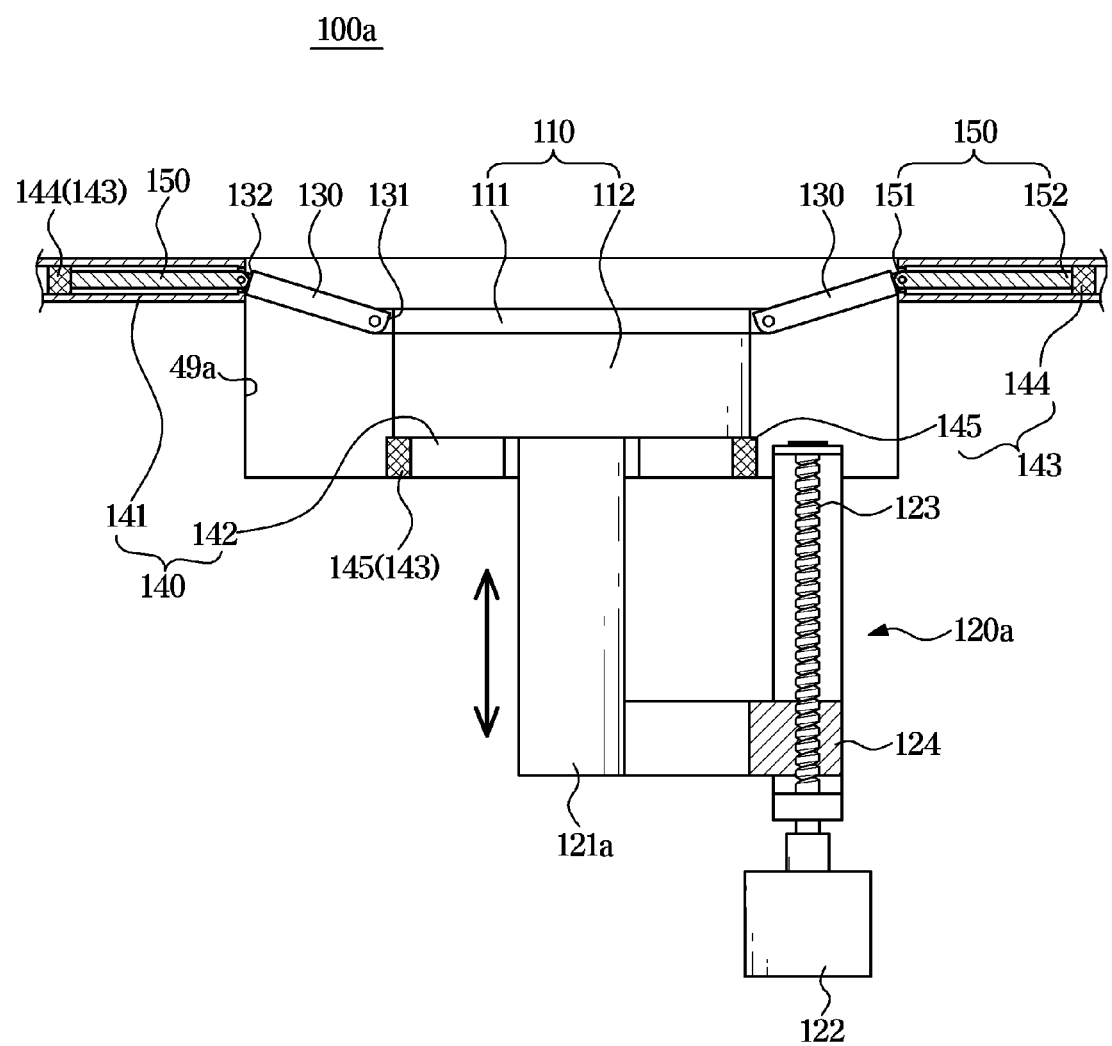
FIG. 11 is a view schematically illustrating a driving device in the input apparatus for a vehicle according to another embodiment of the present disclosure.
Figure 12:
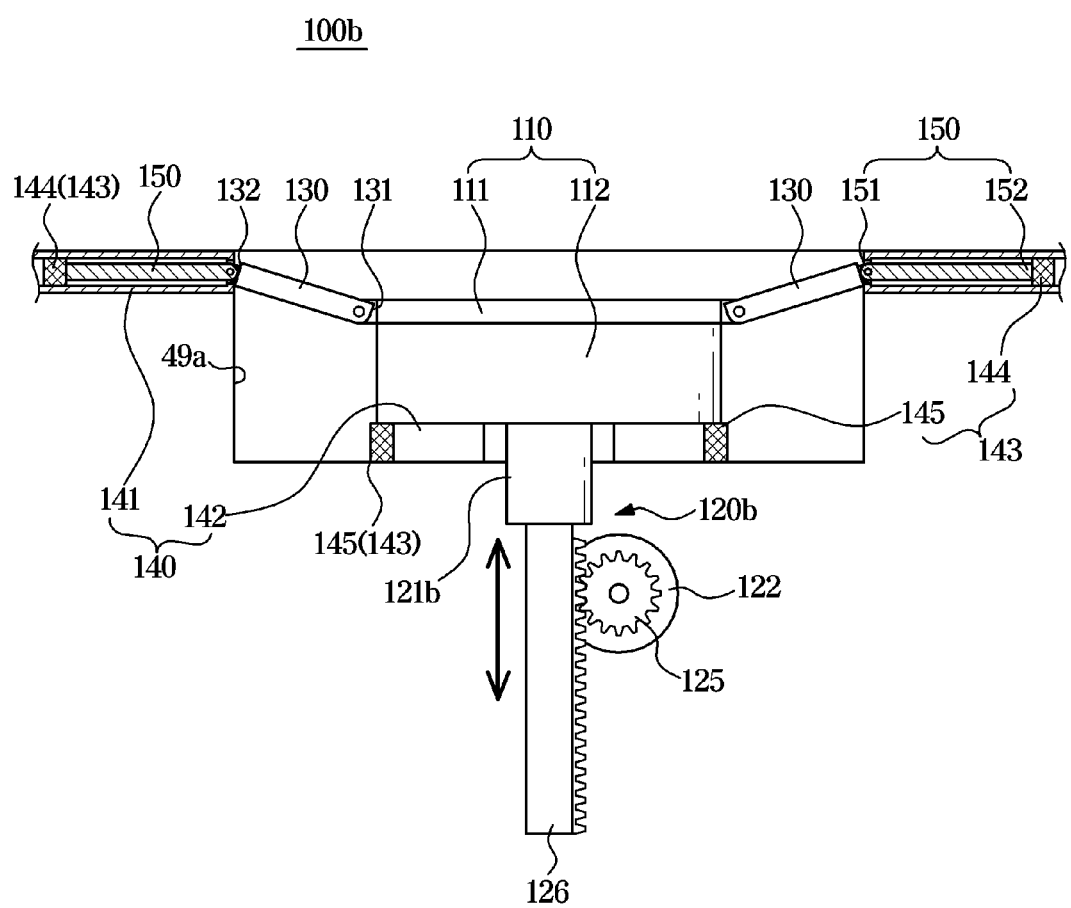
FIG. 12 is a view schematically illustrating a driving device in the input apparatus for a vehicle according to still another embodiment of the present disclosure.

FIG. 11 is a view schematically illustrating a driving device in the input apparatus for a vehicle according to another embodiment of the present disclosure. FIG. 12 is a view schematically illustrating a driving device in the input apparatus for a vehicle according to still another embodiment of the present disclosure.

As shown in FIG. 11, an input apparatus 100a according to another embodiment of the present disclosure may include a driving device 120a for moving a knob 110 and a switching mechanism 130.

Hereinafter, the input apparatus 100a according to another embodiment of the present disclosure will be described based on a difference from the input apparatus 100 according to one embodiment of the present disclosure.

The driving device 120a of the input apparatus 100a according to another embodiment of the present disclosure may include a moving bar 121a connected with the knob 110 to move the knob 110 and a driver 122 provided to provide power to the moving bar 121a.

The driving device 120a may include a screw 123 rotated by operation of the driver 122 and a nut 124 coupled with the screw 123 to translationally move.

The driver 122 may include a motor generating rotation force by being electrically operated. The motor, which is the driver 122, may change a rotation direction of a rotating shaft according to an input current.

The screw 123 is connected with the rotating shaft of the driver 122, and may be provided to be rotated by the operation of the driver 122. The nut 124 is coupled with the screw 123 to be switched from a rotation motion of the driver 122 to a translational motion.

Although not shown in FIG. 11, the nut 124 is provided to prevent rotation, is not rotated with the screw 123, and may be provided to move in a vertical direction according to the rotation of the screw 123.

The nut 124 includes a through hole (not shown) through which the screw 123 passes, and a ball bearing (not shown) for reducing friction is interposed between a screw thread formed on an outer diameter of the screw 123 and a screw thread (or a threaded rod) formed on an inner diameter of the nut 124 to minimize a rotation force loss of the screw 123 and may transfer the rotation force to the nut 124.

The moving bar 121a may be connected with one side of the nut 124. Therefore, the moving bar 121a may be provided to move in a vertical direction as the nut 124 moves.

When the screw 123 is rotated by operation of the driver 122 in one direction, the moving bar 121a may move upward while the nut moves upward. Therefore, the user may rotate the protruding knob 110.

On the contrary, when the screw 123 is rotated by an operation of the driver 122 in the opposite direction, the knob 110 may be accommodated in an accommodator 49a of a plate 49 as the nut 124 moves downward.

As shown in FIG. 12, an input apparatus 100b according to still another embodiment of the present disclosure may include a driving device 120b provided to move a knob 110 and a switching mechanism 130.

Hereinafter, the input apparatus 100b according to still another embodiment of the present disclosure will be described based on a difference from the input apparatus 100 according to one embodiment of the present disclosure.

The driving device 120a of the input apparatus 100b according to still another embodiment of the present disclosure may include a moving bar 121b connected with the knob 110 to move the knob 110 and a driver 122 provided to provide power to the moving bar 121b.

The driving device 120b may include a pinion gear 125 rotated by operation of the driver 122 and a rack gear 126 engaged with the pinion gear 125 to translationally move.

The pinion gear 125 is connected with the rotating shaft of the driver 122 and may be provided to be rotated by the operation of the driver 122. The rack gear 126 is coupled with the pinion gear 125 to be switched from a rotation motion to a translational motion.

Although not shown in FIG. 12, the rack gear 126 is supported by a guider (not shown) for guiding a translational motion and may be provided to move in a vertical direction according to rotation of the pinion gear 125.

The rack gear 126 may be connected with one side of the moving bar 121b. Therefore, the knob 110 may be provided to move in a vertical direction as the rack gear 126 moves.

Describing operation of the moving bar 121b according to still another embodiment of the present disclosure, when the pinion gear 125 is rotated in one direction by operation of the driver 122, the moving bar 121b may increase while the rack gear 126 moves upward. Therefore, a user may rotate the exposed knob 110.

On the contrary, when the pinion gear 125 is rotated in the opposite direction by the operation of the driver 122, the knob 110 may be accommodated in an accommodator 49a of the plate as the rack gear 126 moves downward.

The driving device 120 (see FIG. 6) is not limited to the above description, and may include various shapes and structures within a limitation that the knob 110 and the switching mechanism 130 are movable.

For example, the driving device 120 may include an elastic member (not shown) for providing elastic force and a moving bar 121 moved by elastic force of the elastic member (not shown) in a front-rear direction. The elastic member (not shown) includes a coil spring and may provide various shapes capable of applying elastic force to the moving bar 121.

As is apparent from the above description, an input apparatus for a vehicle according to the present disclosure can increase user convenience by switching between a protruding type and a concave type according to preference of a user.

The input apparatus for a vehicle according to the present disclosure can move so that a knob protrudes or moves downward into a plate.

The input apparatus for a vehicle according to the present disclosure can be switched between the protruding type and the concave type by a switching mechanism improved to move in an interlocking manner with the knob.

The spirit and scope of the disclosure are described by specific embodiments, but the scope of the present disclosure is not limited to the above-described specific embodiments.

Various other embodiments that may be changed or modified by those skilled in the art of the present disclosure without departing from the scope and spirit of the present disclosure defined by the appended claims fall within the scope of the present disclosure.

What is claimed is:

1. An input apparatus for a vehicle, comprising:
    a knob rotatably disposed in a plate;
    a driving device configured to move the knob upwardly to protrude from the plate or move downwardly into the plate; and
    a switching mechanism movable disposed to surround an outer circumferential surface of the knob when the knob is moved upwardly to protrude from the plate or disposed along a circumference of the knob when the knob is moved downward into the plate,
    wherein the switching mechanism includes a plurality of switching rods connected and arranged along the circumference of the knob so that the switching mechanism surrounds the knob, and
    wherein each of the plurality of switching rods includes a supporter connected with the knob and a rotator rotatably connected with the supporter.

2. The input apparatus of claim 1, wherein the switching mechanism is connected with the knob to rotate with the knob.

3. The input apparatus of claim 1, wherein the switching mechanism includes a first switching end supported by the knob so that the switching mechanism protrudes from or moves downward into the plate along with the knob.

4. The input apparatus of claim 3, further comprising a guide including:
    a first guide on an outer side of the switching mechanism; and
    a second guide on one side of the knob to guide movement of the switching mechanism.

5. The input apparatus of claim 4, wherein the plate includes an accommodator in which the knob and the switching mechanism are accommodated, and
    wherein the apparatus further comprises a cover movable disposed to cover the accommodator.

6. The input apparatus of claim 5, wherein a first cover end of the cover is connected with a second switching end of the switching mechanism so that the cover moves as the switching mechanism, moves.

7. The input apparatus of claim 5, wherein the cover is disposed in the first guide to be withdrawn from the first guide.

8. The input apparatus of claim 6, wherein the guide further includes:
    a first fixer in the first guide and configured to fix a second cover end of the cover; and
    a second fixer in the second guide and configured to fix the first cover end so as to fix the switching mechanism.

9. The input apparatus of claim 1, wherein the driving device includes:
    a moving bar connected with the knob to move the knob; and
    a driver configured to provide power to the moving bar.

10. The input apparatus of claim 1, wherein the rotator pivots in a direction farther from the supporter so that the switching mechanism is spread along the circumference of the knob moved downward into the plate.

11. The input apparatus of claim 1, wherein the rotator pivots in a direction approaching the supporter so that the switching mechanism surrounds the outer circumferential surface of the knob protruding from the plate.

12. The input apparatus of claim 1, wherein the plurality of switching rods further include a limiter in the supporter to limit rotation of the rotator.

13. The input apparatus of claim 1, wherein the supporter of each of two adjacent switching rods of the plurality of switching rods are connected with each other, and the rotator of each of the two adjacent switching rods overlaps each other.

14. An input apparatus for a vehicle, comprising:
    a knob configured to protrude from or move downward into a plate; and
    a switching mechanism connected with the knob to protrude from or move downward into the plate along with the knob,
    wherein the switching mechanism includes a plurality of switching rods connected and arranged to surround the knob, and
    wherein each of the plurality of switching rods includes:
        a supporter facing an outer circumferential surface of the knob which protrudes from the plate;
        a rotator disposed along a circumference of the knob, which moves downward into the plate, and rotatably connected to the supporter; and
        a limiter disposed in the supporter to limit rotation of the rotator.

* * * * *